United States Patent [19]

Bonnet

[11] 4,058,498

[45] Nov. 15, 1977

[54] PROCESS FOR THE PREPARATION OF TREATING LIQUIDS, STABLE UNDER STORAGE, ESPECIALLY FOR IMPROVING THE WRINKLE-FREE CHARACTERISTICS OF CELLULOSIC FABRICS TREATED WITH THE SOLUTION

[76] Inventor: Jean Claude Bonnet, 47 avenue de France, Blois (Loir & Cher), France

[21] Appl. No.: 601,043

[22] Filed: Aug. 1, 1975

[30] Foreign Application Priority Data

Aug. 2, 1974 France .................................. 74.27658

[51] Int. Cl.$^2$ ............................................. C08L 61/24
[52] U.S. Cl. .................................. 260/29.4 R; 252/8.8
[58] Field of Search ..................... 260/29.4 R; 252/8.8; 8/185

[56] References Cited

PUBLICATIONS

Chem. Abstracts, vol. 67, 11/1967, 109847r.

*Primary Examiner*—Theodore E. Pertilla
*Attorney, Agent, or Firm*—Karl F. Ross

[57] ABSTRACT

A process for preparing liquid treating agents, stable under storage, especially for improving the wrinkle-free characteristics of cellulosic textiles treated with the liquid in which urea is condensed with formaldehyde in an aqueous solution in the presence of glyoxylic acid. This condensation is carried out in a first step using an acid pH between 2 and 5 with a molar ratio of urea/formaldehyde/glyoxylic acid of 1 : 2 to 10 : 0.03 to 0.6 and at a temperature between 20° and 100° C. In a second stage the reaction is carried out at a slightly acidic pH between 6 and 7 at a temperature between 20° and 60° C with addition of a fresh quantity of urea and eventually a fresh quantity of formaldehyde in an aqueous solution so as to obtain an overall molar ratio of urea/formaldehyde/glyoxylic acid of 1 : 1.5 to 3.5 : 0.03 to 0.6.

9 Claims, No Drawings

PROCESS FOR THE PREPARATION OF TREATING LIQUIDS, STABLE UNDER STORAGE, ESPECIALLY FOR IMPROVING THE WRINKLE-FREE CHARACTERISTICS OF CELLULOSIC FABRICS TREATED WITH THE SOLUTION

The present invention relates to a process for preparing liquid treating agents, stable under storage, especially to improve the nonwrinkling or wrinkle-free characteristics of cellulosic textiles.

Antiwrinkling agents utilized heretofore for cellulosic-based textile materials include methylol compounds or alkoxymethylols of urea (acyclic or cyclic), melamines or carbamates.

For economic reasons, the preferred compounds have been the methylol compounds and the alkoxymethylols of urea. These compounds, in the form of aqueous solutions, have poor stability on storage and have a tendency to form crystalline solids so that they cannot be readily used.

An improvement in the stability on storage of these compounds can be obtained by incorporating glycols or glyoxals during the condensation process, the reaction taking place in a plurality of stages.

It is the object of the present invention to provide a process for the preparation of treating agents for the purposes described in which there is freedom from the formation of crystalline masses upon storage and which generally are capable of storage for long periods of time without significant change.

This object is attained, in accordance with the present invention, by the preparation of a treating agent, especially for cellulosic fabrics in order to render the latter wrinkle-free or to reduce the wrinkling of such fabrics which comprises condensing urea and formaldehyde in an aqueous solution in the presence of glyoxylic acid, the condensation taking place in two stages. In the first stage an acid pH between 2 and 5 is used with a molar ratio of urea/formaldehyde/glyoxylic acid of 1 : 2 to 10 : 0.03 to 0.6. The first stage is carried out at a temperature between 20° C and 100° C.

During a second stage, a slightly acidic pH is maintained (pH = 6 to 7) and the temperature is held between 20° C and 60° C. In the second stage a fresh quantity of urea is added and, if desired, a fresh quantity of formaldehyde in an aqueous solution so as to obtain a final molar ratio of urea/formaldehyde/glyoxylic acid of 1 : 1.5 to 3.5 : 0.03 to 0.6.

In spite of the relatively small quantity of glyoxylic acid which is used, the compounds have been found to be of great economic value since they are free of the disadvantages of earlier treating compositions.

During the first phase of the reaction the urea is reacted with formaldehyde and glyoxylic acid as noted at a pH between 2 and 5. Preferably this pH is between 2 and 3.

The pH is determined by the glyoxylic acid present in the mixture but can be further adjusted if necessary by the addition of a mineral acid such as hydrochloric acid, and sulfuric acid, or phosphoric acid. It is also possible to use, for adjustment of the pH, a strong organic acid such as paratoluene-sulfonic acid, oxalic acid or phthalic acid.

The urea can be introduced into the reaction mixture in its solid form or in solution.

The formaldehyde is preferably used in the form of an aqueous solution or in a polymeric state such as paraformaldehyde, trioxane, or tetroxane.

The glyoxylic acid is preferably utilized in the form of an aqueous solution having concentration of 50% although it can also be employed in the pure state.

As noted previously, the urea is reacted with formaldehyde and glyoxylic acid in the first stage in the molar ratio of 1 : 2 - 10 : 0.03 - 0.6 although the preferred molar ratio is 1 : 3 - 6 : 0.03 to 0.3.

The condensation in the first stage is carried out at a temperature between 20° and 100° C, preferably between 50° and 90° C. The condensation is carried out until 1 cc of the reaction mixture, when introduced into 10 milliliters of a mixture of water and acetone (30/70 parts by volume), gives a permanent clouding.

The duration of the reaction is a function of the pH and of the condensation temperature selected. For example, if one operates with refluxing at 100° C with a pH between 2 and 3.5 the duration of the reaction is about 10 minutes. However at a pH of 4 to 5 at 30° to 40° C the reaction time is several hours.

In the second stage of the operation, the precondensate formed in the first stage is reacted with an additional quantity of urea and, if required, with an additional quantity of formaldehyde such that the final molar ratio of urea/formaldehyde glyoxylic acid is 1 : 1.5 - 3.5 : 0.03 - 0.6 preferably 1 : 2 - 3 : 0.03 - 0.3.

The second stage reaction is carried at a pH between 6 and 7, preferably between 6.3 and 6.8, at a temperature between 20° and 60° C, preferably between 40° and 50° C.

Here again the duration of the reaction depends on the temperature and the pH. For example, the reaction is three hours for a temperature of 50° to 55° and a pH between 6.5 and 6.7.

The resulting product is the treating agent for the cellulosic textiles and can be introduced into water to form an aqueous solution containing 40 to 50% of active materials. Above and in the following description all percentages are by weight unless otherwise indicated. These solutions have a storage stability of the order of 6 months when maintained at a temperature below 25° C.

The reactivity is nevertheless comparable to conventional treatment agents of the urea methylol type and used in the form of more or less stiff pastes. Consequently the solutions of the active materials of the present invention are easier to use than the last mentioned conventional products.

The treatment agents of the present invention can be used in a manner well known to the skilled worker in the art in the form of impregnation baths of an aqueous base to which can be added the catalysts conventionally employed for reticulation or cross link.

The catalysts can be of the acid type such as, for example, ammonium salts of strong acids, magnesium chloride or zinc chloride, zinc nitrate, and alkanolamines in the form of their chlorohydrates.

The catalysts can be used individually or in mixtures and in conventional proportions.

The fabric to be treated is impregnated by conventional techniques, e.g. by padding, the concentration of the impregnating baths being of the order of 50 to 150 grams per liter according to the results desired.

After application of the solution, the fabric is dried at a temperature of about 100° C for a period of 5 minutes and the polymerization is carried out in the presence of the catalyst at 100° C for a period of 1 to 2 minutes followed by polymerization at 150° C for about 4 minutes. The first of the polymerization steps permits control of the fiberous character of the resin.

During drying or thereafter the fabric can be subjected to mechanical treatment, e.g. creasing, calendering, pressing or embossing. The resulting fabric is resistant to wrinkling and shrinkage and the embossed pattern or the folds produced have excellent resistance to washing.

The fabric after treatment shows no sign of yellowing even after heating to a temperature of 150° C.

Furthermore, the new antiwrinkling agents of the present invention are compatible with other fabric treatment substances such as hydrophobic agents, leveling agents, plasticizers, wetting agents and with solutions or dispersions of plastic materials.

The invention will be more apparent from the following specific examples which are illustrative but not limiting of the invention.

EXAMPLE 1

Into a two liter flask provided with an agitator, a reflux cooler and a thermometer, there are introduced 100 grams of urea, 700 grams of formaldehyde (42% in water) and 37 grams of glyoxylic acid (in a solution with a concentration of 50% in water). The resulting reaction mixture has a pH of 2.9. After refluxing for ten minutes, the mixture is cooled to a temperature of 45 to 50° C. 100 grams of urea is then added and the pH is adjusted to 6.5 with a solution of sodium hydroxide (50% in water) whereupon the mixture is agitated for 3 hours at 50° to 60° C. On cooling to 25° C and neutralizing the solution to a pH of 7.0, there is obtained a colorless clear solution which contains 45.3% of dry solids and has a molar ratio of urea/formaldehyde/glyoxylic acid of 1 : 2.8 : 0.07. This product is highly stable on storage an maintains a perfect liquid state for 6 months.

EXAMPLE 2

Into a flask as described in Example 1, 100 grams of urea, 700 grams of formaldehyde (42% in water) and 74 grams of an aqueous solution of 50% glyoxylic acid are introduced. The solution has a pH of 2.1. After 10 minutes of refluxing, followed by cooling to a temperature of 40° to 50° C, 150 grams of urea and 300 grams of formaldehyde (42% concentration in water) are added and the pH is adjusted to 6.7 with a sodium hydroxide solution (50%). The reaction mixture is agitated for 3 hours at 50° C to 60° C and then is cooled and neutralized to a pH of 7.0. The resulting colorless clear solution contains 50% dry matter and has an overall molar ratio of urea/formaldehyde/glyoxylic acid of 1 : 3.3 : 0.1. The composition was stable on storage for at least six months.

EXAMPLE 3

A 2 liter flask, provided with an agitator, a reflux condenser and a thermometer, is charged with 100 grams of urea, 800 grams of formaldehyde (42%, aqueous) and 18 grams of glyoxylic acid (50% concentration). The solution has a pH of 2.6. The reaction mixture is refluxed for twenty minutes and is then cooled to 40° C - 50° C. A hundred grams of urea is added and the pH is adjusted to 6.5 with a 50% sodium hydroxide solution. The mixture is reacted for 3 hours at 50° C to 60° C.

Cooling to 25° C and neutralization to pH 7.0, a colorless clear solution is obtained which contains 53% dry matter and has a final urea/formaldehyde/glyoxylic molar ratio 1 : 3.4 : 0.03. This composition is stable on storage for at least 6 months.

EXAMPLE 4

A mercerized poplin cotton fabric is impregnated by padding in a bath containing 150 parts by water of the solution obtained in Example 1, 35 parts by water of ammonium chloride catalyst and 820 parts by weight of water. The fabric has a weight of 120 grams per m² and the treated fabric is designated as Specimen A. The excess liquid is squeezed out of the fabric.

The impregnation is repeated with a bath containing 150 parts by water of crystalline urea methylol, 30 parts by weight of ammonium chloride and 820 parts by weight of water (Specimen B).

The wrinkle recovery on drying of the different specimens of fabric is determined by angle measurements according to standard MONSANTO AATCC 66–1968 (see pp. 159–160 q Wingate, *TEXTILE FABRICS AND THEIR SELECTION*, Prentice-Hall, N.Y. 1964). Firstly, the specimens are dried for 2 minutes at 105° C on a tenter frame without polymerization with the following results:

| Sample | Control (Nontreated Fabric) | Sample B | Sample A |
|---|---|---|---|
| Angle | 114 | 166 | 185 |

Then the specimens, after drying 2 minutes at 105° C on the tenter frame, are subjected to polymerization for 4 minutes at 150° C with the following results:

| Sample | Control (Nontreated Fabric) | Sample B | Sample A |
|---|---|---|---|
| Angle | 114 | 185 | 188 |

EXAMPLE 5

A specimen of mercerized cotton poplin fabric of a weight of 120 grams per m² is impregnated by padding in a bath containing 150 parts by weight of the solution produced in Example 2, 30 parts by weight of ammonium chloride and 820 parts by weight of water. This specimen is identified as Specimen A'. Specimen B previously described was used. According to the standard MONSANTO AATCC 66–1968 the angles were measured to determine the wrinkle recovery on drying of the specimens. For the specimens dried for 2 minutes at 105° C on a tenter frame without polymerization the following values were obtained:

| Sample | Control (Nontreated Fabric) | Sample B | Sample A' |
|---|---|---|---|
| Angle | 114 | 166 | 164 |

The specimens were then subjected to polymerization for 4 minutes at 150° C:

| Sample | Control (Nontreated Fabric) | Sample B | Sample A' |
|---|---|---|---|
| Angle | 114 | 185 | 198 |

EXAMPLE 6

A fabric as described in Example 5 was similarly impregnated in a bath containing 150 parts by water of the solution made in Example 3, 30 parts by water ammonium chloride and 820 parts by weight water (Specimen A"). Specimen B was prepared as described in Example 4. Measurements were taken of the angles according to the standard MONSANTO AATCC 66-1968 to determine the crease recovery on drying of the specimens.

For the specimens dried for 2 minutes at 105° C on the tenter frame the following values were obtained:

| Sample | Control (Nontreated Fabric) | Sample B | Sample A" |
|---|---|---|---|
| Angle | 114 | 166 | 179 |

After further polymerization for 4 minutes at 150° C the following results were obtained:

| Sample | Control (Nontreated Fabric) | Sample B | Sample A" |
|---|---|---|---|
| Angle | 114 | 185 | 195 |

EXAMPLE 7

The dynamometric strength of the different specimens prepared in the preceding Examples was tested with the following results:

| | Sample | | Control (Nontreated Fabric) | B | A | A' | A" |
|---|---|---|---|---|---|---|---|
| Dynamometric Resistance in Kgf | Nonpolymerized (2 minutes at 105° C) | warp | 14.3 | 15.1 | 14.3 | 14.8 | 15.6 |
| | | weft | 7.6 | 7.5 | 6.2 | 6.8 | 7.2 |
| | Polymerized (2 minutes at 105° C 4 minutes at 150° C) | warp | 14.3 | 14 | 10.4 | 11.8 | 12.1 |
| | | weft | 7.6 | 5.8 | 3.8 | 4.1 | 5.5 |

I claim:

1. A process for preparing a fabric-treatment liquid, especially to reduce wrinkling of cellulosic fabrics and adapted to be stored for long periods, said process comprising:
    a. in a first stage condensing urea and formaldehyde in an aqueous solution in the presence of glyoxylic acid at a pH between two and five at a temperature of 20° C to 100° C and with a molar ratio of urea/formaldehyde/glyoxylic acid of substantially 1 : 2 to 10 : 0.03 to 0.6 to produce a precondensate; and
    b. in a second stage reacting said precondensate at a pH between 6 and 7, at a temperature between 20° C and 60° C with an additional quantity of urea to produce a final condensation with an overall molar ratio of urea/formaldehyde/glyoxylic acid of 1 : 1.5 to 3.5 : 0.03 to 0.6.

2. The process defined in claim 1 wherein, a step (b), an additional amount of formaldehyde is reacted with said precondensate.

3. The process defined in claim 1 wherein step (a) is carried out with said urea, formaldehyde and glyoxylic acid in a molar ratio of substantially 1 : 3 to 6 : 0.03–0.3.

4. The process defined in claim 1 wherein step (a) is carried out at the refluxing temperature of the reaction mixture thereof.

5. The process defined in claim 4 wherein step (a) is carried out at a pH between two and three.

6. The process defined in claim 1 wherein step (b) is carried out at a pH between 6.3 and 6.8.

7. The process defined in claim 1 wherein step (b) is carried out at a temperature between 40° C to 50° C.

8. The process defined in claim 1 wherein the condensation product of step (b) has a molar ratio of urea/formaldehyde/glyoxylic acid of substantially 1 : 2 to 3 : 0.03 to 0.3.

9. An antiwrinkling fabric treatment agent as made by a process of claim 1.

* * * * *